3,489,419
STATIC PRESSURE SYSTEM FOR MECHANICAL SEALS
Andrew Stratienko, Philadelphia, Pa., assignor to King of Prussia Research and Development Corporation, King of Prussia, Pa., a corporation of Pennsylvania
Filed Nov. 1, 1967, Ser. No. 679,867
Int. Cl. F16j 15/34, 15/40
U.S. Cl. 277—15     3 Claims

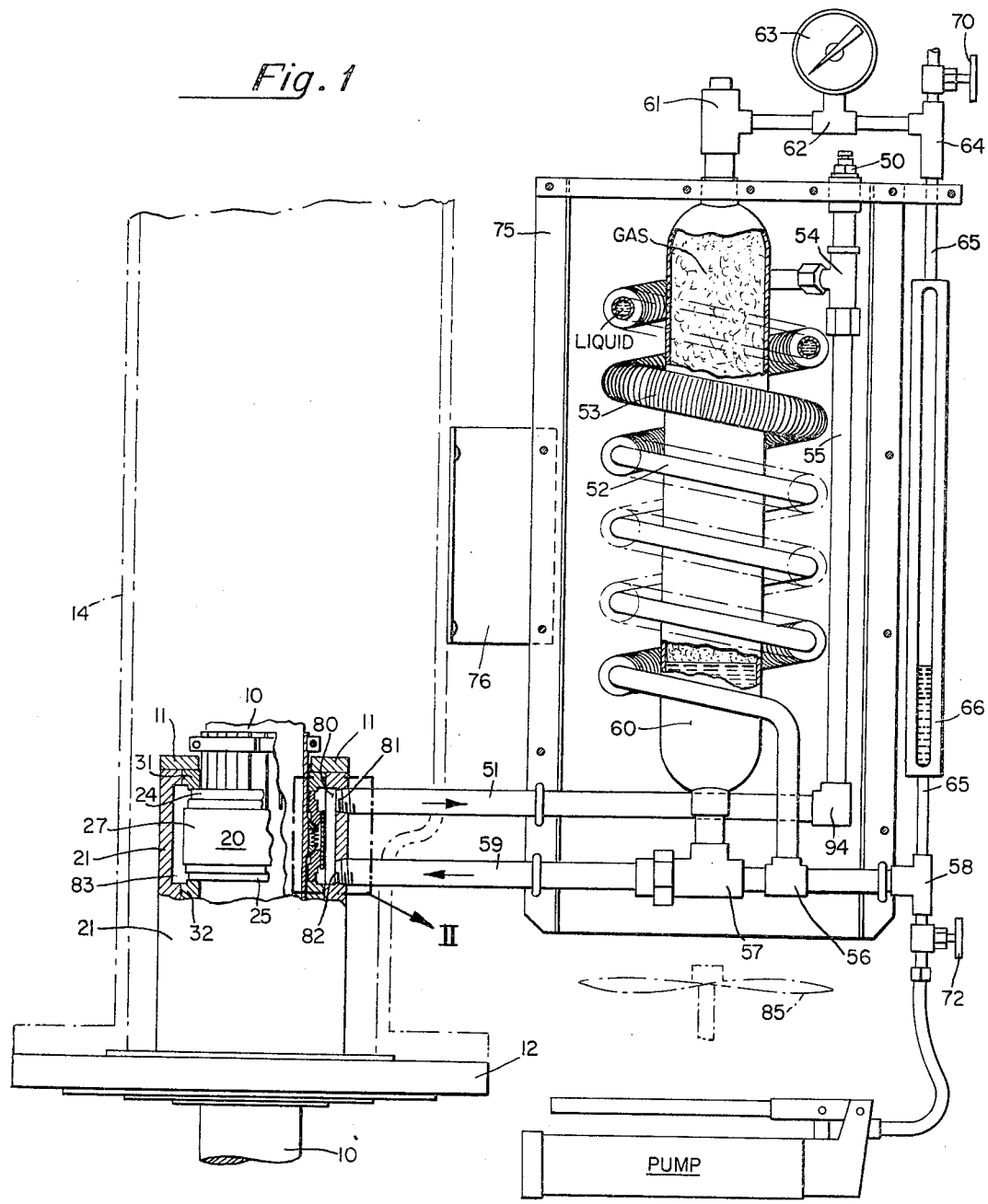

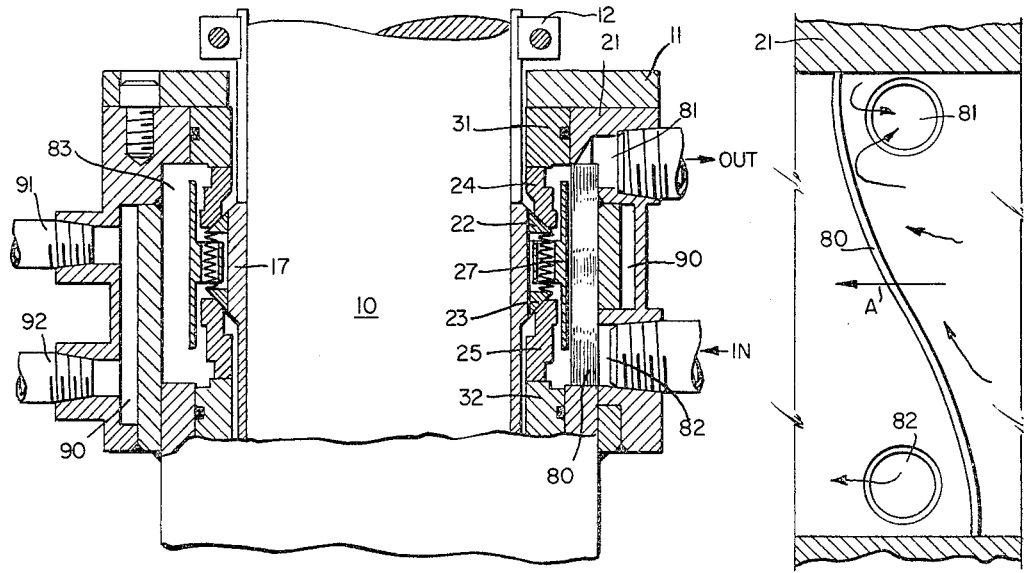
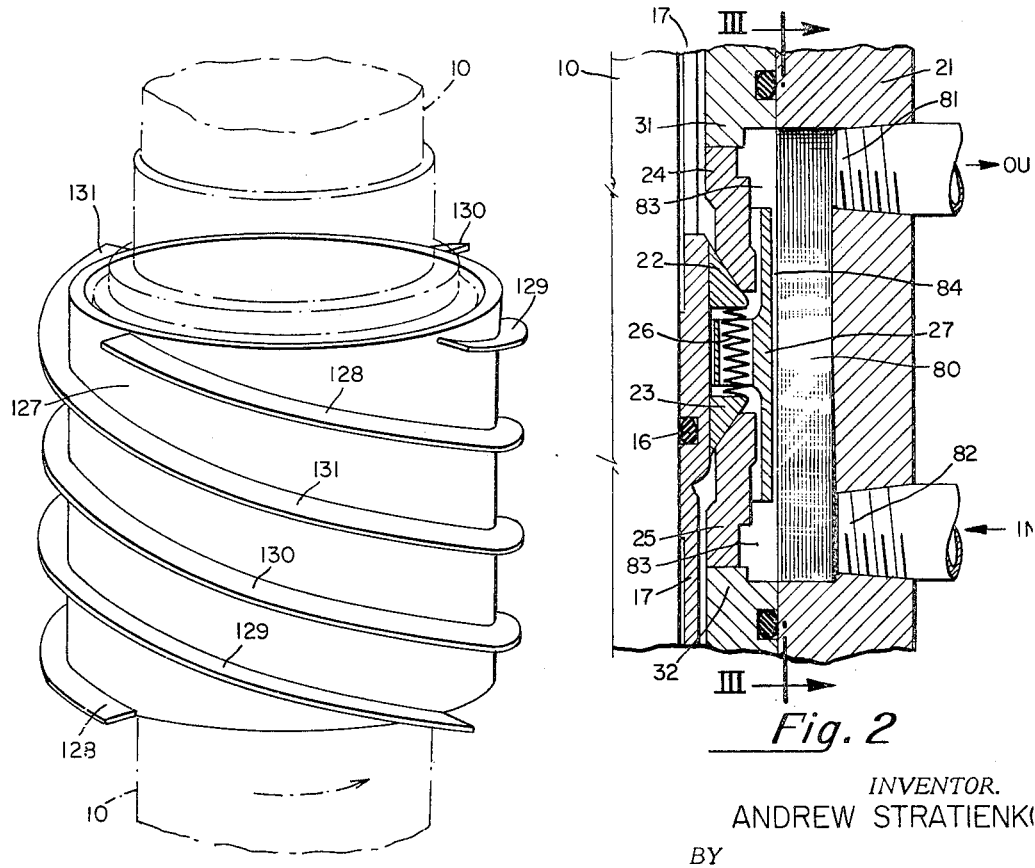

ABSTRACT OF THE DISCLOSURE

A static pressurized system for the sealant for the mechanical seals of a rotating shaft is disclosed in which the shaft itself functions as the pump. The sealant supply is under compressed air (or other gas) pressure. A vane is provided which cooperates with the rotating shaft to develop the pumping force required to circulate the sealant, without need of a separate pump. The vane may be stationary or it may rotate with the shaft. The circulating sealant is cooled, preferably by an air-draft technique which requires no additional power. No gas or air is lost during operation of the system. Replenishment of sealant re-establishes the air pressure.

FIELD OF THE INVENTION

This invention relates to mechanical seals for rotating shafts, and particularly to the sealant circulation system for rotating shafts equipped with double mechanical seals.

DESCRIPTION OF THE PRIOR ART

The prior art has heretofore provided separate power units for circulating the sealant to the mechanical seal and for cooling the sealant.

SUMMARY OF THE INVENTION

The present invention provides a closed static pressure system which utilizes the rotating shaft itself to pump the sealant to the mechanical seals. Thus, the system of the present invention eliminates the separate pump and the motor which have heretofore been required for circulating the sealant. In some forms of the invention, no power means are used to cool the sealant.

BRIEF DESCRIPTION OF THE DRAWING

FIG. 1 is an elevational diagrammatic view, partly in section, of a system according to the present invention;

FIG. 2 is an enlarged view of that portion of FIG. 1 shown in the dot-and-dash rectangle identified as II, showing the details of the mechanical seal and showing a stationary pumping vane;

FIG. 3 is a view of the stationary pumping vane of FIG. 2 as seen looking along the line III—III of FIG. 2;

FIG. 4 is a view, in section, of a modified form of the invention in which a water jacket is provided in the vicinity of the mechanical seal for cooling, or for aiding in cooling of, the sealant;

FIG. 5 is a modification showing a rotating form of helical pumping vane.

DESCRIPTION OF THE PREFERRED EMBODIMENTS

Referring now to FIG. 1, the reference numeral 10 identifies a shaft which, for purposes of the present discussion, may be assumed to be the impeller or agitator shaft in a top entering mixer in which the mixer tank is closed and under pressure. As is well known, a seal for such an impeller shaft is required to prevent the escape of liquid along the shaft. While a stuffing box type of seal may be used, it is desirable, in many cases at least, to use an end-face or double mechanical seal, and such a seal is indicated in FIG. 1 identified comprehensively by the reference numeral 20. The constructional details of the seal 20, as seen in section at the area of the dot-and-dash rectangle II in FIG. 1, are shown enlarged in FIG. 2.

The mechanical seal 20 is contained within a cylindrical housing 21 which surrounds the shaft 10 and is supported on a flanged mounting plate 12 at the top of the mixing tank. Within the housing 10 a shaft sleeve 17, slotted at its upper end portion, embraces the shaft 10. A locking collar or clamp 12 clamps the slotted upper end portion of sleeve 17 tightly to the shaft 10 for rotation therewith. The sleeve 17 is provided with an O-ring 16.

Secured to and rotating with sleeve 17 are the rotating parts of the mechanical seal assembly. These rotating parts may, in a typical case as illustrated in FIG. 2, include the upper and lower wedge rings 22 and 23 which are thrust apart by a series of compression springs 26. Also rotating with the sleeve 17 are the upper and lower seal rings 24 and 25 against which the wedge rings are thrust, and the annular retaining collar 27 having guide holes therein through which the compression springs pass. The upper and lower rotating seal rings abut against the faces of upper and lower stationary seal seats 31 and 32, respectively. The lower stationary seal seat 32 is supported on a seat support (not shown) which in turn is supported on an internal shoulder of cylindrical housing 21. The upper stationary seal seat 31 abuts against the top plate 11 of the housing 21. The upper and lower seal rings 24 and 25 are ordinarily carbon, having lapped faces which abut against the stationary seal seats 31 and 32, respectively.

FIG. 1 shows the closed static pressure system provided in accordance with the present invention. As will be described, circulation of the sealing oil or other sealant is effected by the rotating shaft 10 in cooperation with a vane which may be a damming vane such as vane 80 of FIGS. 1–4, or which may be a helical thrust vane such as disclosed in FIG. 5. The flow is from the OUT port 81 in the housing 21 of the mechanical seal assembly through the piping 51, elbow 94, up through piping 55, T 54, down through the coil 52, T's 56 and 57, and through piping 59 into the IN port 82 in the mechanical seal housing 21. A main annular passage 83 provides communication between the IN and OUT ports 82 and 81.

The sealing oil is introduced into the system through the oil fill valve 72, as by means of a manually operable pump. An air vent or bleeder valve 50 is provided in the system above the T 54 to allow air to escape during the filling of the system with sealing oil.

The tube coil 52 may be provided with a plurality of heat exchange fins 53. An open ended cylindrical shroud 75 surrounds the coil 52 and is mounted, as by bracket 76, on the drive housing 14.

In the operation of the system, the sealing oil becomes heated by the friction at the seal faces, and also by heat which is carried up the shaft 10 from the tank liquid, and this heat is carried by the sealing oil to coil 52 where the oil is cooled by the air moving up through the chimney or shroud 75 through the coil 52 and through the heat exchange fins 53.

The system also includes a reservoir in the form of a tank 60 which extends up through the center of the coil 52. The lower end of tank 60 is connected to the circulation system at the T 57. The upper end of tank 60 is connected to a compressed air fill valve 70 by way of the T's 61, 62 and 64. A pressure gauge 63 is connected to T 62. Piping 65 extends upward from the oil fill valve 72 to the air fill valve 70 and is provided with a window or sight 66 to enable the operator to monitor the quantity of sealing oil in the system. Sight 66 preferably extends for most of the length of the tank 60.

The system is supplied with sealing oil through the oil fill valve 72. Compressed air or other gas is introduced into the system through the valve 70 to apply the necessary amount of pressure to the oil in the system. This pressure is applied downwardly to the oil in the tank 60 and to the oil in the sight line 65. Thus, pressure is applied to the oil in the circulation system at the T 57 and at the T 58.

The pressure of the sealing oil on the double mechanical seal 20 should always exceed the pressure exerted on the mechanical seal by the vapors or other fluids of the presssurized tank. When sealing oil is consumed or lost, the pressure in reservoir or tank 60 will drop, but sufficient oil is introduced initially into the system so that when oil is lost the pressure will not drop below the pressure exerted on the mechanical seal by the tank vapors or liquid. The level of the sealing oil is observed in sight gauge 66, and when necessary oil is added through valve 72. The system does not lose air or gas, so that when the lost oil is replenished, the original pressure is re-established.

To enable the shaft 10 to function as a pump for the sealant system, the present in the preferrred form, provides a ribbon damming vane 80 (FIGS. 1–4) which is secured, as by welding, to the interior of housing 21 of the mechanical seal assembly and which extends radially toward the shaft 10. The vane 80 extends almost to the outer surface of the annular retaining collar 27, forming therebetween a narrow passage 84. As shown in FIGS. 2 and 3, vane 80 is a double-curve ribbon secured to the housing 21 and disposed to be located on one side of the OUT port 81 and on the opposite side of the IN port 82. However, ribbon 80 could be a straight line ribbon diagonally disposed to be on opposite sides of the ports 81 and 82.

In operation, when the agitator shaft 10 is driven rotationally by a known form of drive means, not shown, the rotatable elements of mechanical seal assembly 20, including the seal rings 24 and 25 and the retaining collar 27, rotate therewith. This causes the sealing oil which surrounds the rotating seal parts and occupies the annular chamber 83 to move in the same direction as the shaft 10 is rotating, due to the frictional and cohesive forces which are involved. The direction of rotation of the shaft 10, in the illustrated embodiment, is assumed to be in the direction represented by the arrow A in FIG. 3. It will be seen that when the sealing oil, moving in the direction of the arrow A, encounters the damming vane 80, the oil is forced out of the OUT port 81. At the same time, the sealing oil is pulled in through the IN port 82. Thus, circulation of the sealant through the closed system is established, the sealant oil moving through the OUT port 81, pipe 51, elbow 94, the pipe 55, the T 54, down through the coil 52, through the T's 56 and 57, and back through pipe 59 and into the IN port 82.

Any sealing oil that may be consumed or lost in the operation of the system is replenished automatically by oil from the reservoir or tank 60. The compressed air in the tank 60 and in the upper portion of the piping 65 forces the oil downward and into the circulation system. The sealing oil is forced by the pressure of the system between the surfaces of the moving and fixed elements of the mechanical seal.

Heat is produced by friction at the seal surfaces. In addition, the agitator stem 10 may carry a substantial quantity of heat up from the liquids and vapors which are in the mixer tank. Thus, it is necessary to cool the circulating oil. In some cases, sufficient cooling is accomplished by the tube coil 52. In other cases, it is necessary or at least desirable to provide coil 52 with a plurality of heat-exchange fins 53. Movement of cooling air at a satisfactory rate up through the coil 52 and up through the fins 53 may be achieved by an open-ended cylindrical shroud 75 which surrounds the coil. Shroud 75 creates a chimney effect, in that the air heated by the hot oil in te tube 52, and by the hot fins 53, rises pulling up cooling air from below. In some instances, it may be desirable or necessary to install a fan, such as fan 85, to increase the movement of air up through the coil 52 and fins 53. In other cases, it may be necessary to provide additional cooling, and in such cases the construction surrounding the mechanical seal assembly may be modified to include a water jacket, such as water jacket 90 shown in FIGURE 4. Water from a water supply or cooler will then flow in through the port 91 and out through the port 92.

A modification of the vane is illustrated in FIG. 5. In FIG. 5, the retaining collar of the mechanical seal assembly is represented by the reference numeral 127 and the external annular surface of the retaining collar 127 is provided with a series of helical pumping vanes. In FIG. 5, four helical pumping vanes 128–131 are shown spaced 90° apart. When the helical pumping vanes, such as vanes 128–131 are used, the stationary vane 80 is omitted. In FIG. 5, the helical vanes, starting at points 90° away from each other, define helical paths about the outer surface of the retaining collar 127. It will be seen that when the shaft 10 is driven rotationally in the clockwise direction, as indicated by the arrow in FIG. 5, the sealing oil in the annular space 83 will be forced upwardly along the outer surface of the retaining collar 127. This will force oil out of the OUT port 81 and will pull the oil in through the IN port 82, thereby achieving the desired circulation of the sealant through the closed system.

It will be seen that the present invention, by using the stem or mixer shaft itself to provide the pumping force, eliminates the separate pump and pump motor used by the prior art for circulating the sealant. It also necessarily eliminates the heat which the pump and motor would, if used, add to the system and which would have to be carried away.

In some cases, it may be necessary or desirable to add ribs to the external surface of the mixer shaft to provide increased driving force for the sealant, but for many installations the addition of such ribs or baffles will not be necessary.

The pressure system of the present invention has been described above as operating in one direction of rotation of the mixer shaft 10, causing the sealant to flow outwardly through port 81 and up through the pipe 55 and down through coil 52. This is the preferred direction of flow, since this is the direction which is aided by the thermosiphon effect. If the mixer shaft 10 be driven in the opposite direction of rotation, the sealant will be forced out of the lower port 82, up through coil 52, down through the pipe 55 and into the upper port 81. This will work, but not as satisfactorily since the direction of flow is now opposed by the thermo-siphon effect.

It is to be particularly noted that the system of the present invention is a static pressure system in that the compressed air or gas, once added, will continue to provide the desired pressure, without replenishing of the gas or other adjustment of the gas supply. It is only necessary to maintain the level of the sealing oil between selected limits.

While the preferred embodiments of this invention have been described in some detail, it will be obvious to one skilled in the art that various modifications may be made without departing from the invention as hereinafter claimed.

What is claimed is:

1. In apparatus in which a rotating shaft is equipped with a mechanical seal assembly having a housing having therein an annular chamber for sealant and input and output ports therefor, and component parts within said housing which are connected to and rotate with the shaft and which cooperate with stationary parts of the seal assembly to inhibit the escape of fluids along said shaft, the improvement which comprises the provision of a closed system containing sealant under pressure and having connections to said input and output ports of said chamber of said seal-assembly housing, and a vane extending radially into said annuar chamber and cooperating with said rotating shaft to effect circulation of said sealant through said chamber and through said closed system, said vane being a stationary ribbon vane mounted on said seal-assembly housing and extending radially into said chamber, the outer edge of said vane being in proximity to the rotating parts of said seal assembly, said vane being shaped and located to be on opposite sides of said input and output ports, whereby the rotating shaft causes the sealant to flow in the direction of shaft rotation against said stationary vane to force sealant out one port and to pull sealant into the other port, said closed system including a tube coil and an open-ended cylindrical shroud surrounding said coil for causing an updraft of air through said coil for cooling the sealant in said coil.

2. Apparatus according to claim 1 characterized in that a resorvoir tank is within said coil, the lower end of said tank being connected to said closed system, the upper end of said tank containing a compressed gas for maintaining the circulation system under static pressure.

3. Apparatus according to claim 2 characterized in that said seal-assembly housing is surrounded by a water jacket and in that said water jacket is connected to a source of water supply for further cooling said sealant.

References Cited

UNITED STATES PATENTS

| | | | |
|---|---|---|---|
| 2,628,852 | 2/1953 | Voytech | 277—15 |
| 2,687,096 | 8/1954 | Armacost | 277—15 |
| 2,824,759 | 2/1958 | Tracy | 277—15 |
| 3,106,099 | 10/1963 | Jeffrey et al. | 277—15 X |
| 3,220,801 | 11/1965 | Rill et al. | 277—62 X |
| 3,301,191 | 1/1967 | Warren | 277—62 X |

FOREIGN PATENTS 496,363    4/1930    Germany.

SAMUEL ROTHBERG, Primary Examiner

U.S. Cl. X.R.

277—22, 62, 67